United States Patent [19]
Alford

[11] 3,865,133
[45] Feb. 11, 1975

[54] SELF CLEANING CHECK VALVE

[75] Inventor: James W. Alford, South St. Paul, Minn.

[73] Assignee: Minnesota Mining and Manufacturing Company, St. Paul, Minn.

[22] Filed: Oct. 31, 1973

[21] Appl. No.: 411,280

[52] U.S. Cl............ 137/512, 137/512.15, 137/525, 137/604, 137/606
[51] Int. Cl............................................. F16k 15/14
[58] Field of Search ...... 137/512, 525, 512.15, 604, 137/606

[56] References Cited
UNITED STATES PATENTS

| | | | |
|---|---|---|---|
| 3,132,665 | 5/1964 | Rovin et al. | 137/512 |
| 3,210,011 | 10/1965 | Barasko | 137/604 X |
| 3,361,161 | 1/1968 | Schwartz | 137/604 |
| 3,451,422 | 6/1969 | Chorkey | 137/525 |
| 3,459,217 | 8/1969 | Callahan | 137/525 X |
| 3,578,020 | 5/1971 | Rochte et al. | 137/512 |

Primary Examiner—William R. Cline
Attorney, Agent, or Firm—Alexander, Sell, Steldt & DeLaHunt

[57] ABSTRACT

A self-cleaning check valve comprising a valve stem having a central bore and outlets, and a flexible sleeve of elastomeric material covering the stem and outlets. Material is pumped through said bore and said outlets deforming the sleeve and flowing outward. When no material is being pumped through said bore the sleeve returns to its undeformed shape covering the discharge opening thereby closing the valve and preventing foreign material from entering the discharge opening.

4 Claims, 2 Drawing Figures

PATENTED FEB 11 1975 3,865,133

SELF CLEANING CHECK VALVE

BACKGROUND OF THE INVENTION

1. Field Of The Invention

This invention relates to self-cleaning check or poppet valves.

2. Description Of The Prior Art

Spring-loaded poppet or check valves wherein springs are used to close the valve are known in the art. Such valves are commonly made of metal or other rigid materials. Foreign material, such as sand or other impurities, can enter the valve and the movable, spring-loaded, portion of the valve is unable to close completely thereby allowing foreign material to back up into the valve and the lines supplying the valve. This problem is particularly acute when the valves are used for mixing of two-part resin systems which after mixing form a polymeric resinous material. When using such resins, an ever present problem is small amounts of the two resin components remain in the dispensing mechanism flowing back into the valve plugging the apparatus and preventing the valve from operating properly. Such malfunction of the valve results in improper proportioning of the resin system and the desired resin properties are not achieved. As the malfunction progresses a complete dismantling of the equipment for cleaning is required. This is particularly undesirable where the plugged equipment is used for repairing leaks in sanitary and storm sewers. To repair the sealing equipment it must be withdrawn from the sewer line, a distance of up to several hundred feet, cleaned, reinserted in the sewer line and moved to the appropriate sealing position. This is inconvenient, wasteful, expensive and time consuming.

BRIEF SUMMARY OF THE INVENTION

The present invention is an improved, self-cleaning check valve. The valve comprises a valve stem having a central bore and terminating with a closed end wall, an inlet opposite said end wall adapted for connection to a source of material and at least one discharge opening formed in the stem adjacent said end wall. A flexible sleeve of elastomeric material is placed in contact with the stem and covers the outlet of said valve stem so that when material is pumped in said inlet, through said bore and out said discharge opening said sleeve expands elastically allowing material to flow, and when no material is being pumped the sleeve contracts covering the discharge opening, preventing foreign material from entering the discharge opening and bore.

DESCRIPTION OF THE DRAWINGS

A further understanding of the invention may be had by reference to an illustrative embodiment described herein and a mixing chamber using said embodiment, all as the accompanying drawing shown wherein.

DESCRIPTION OF THE PREFERRED EMBODIMENTS

Figure 1:
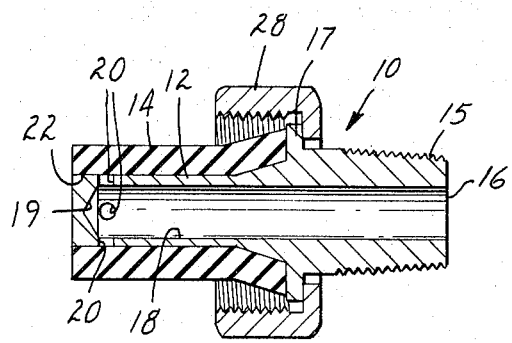
FIG. 1 is a sectional view of the valve of this invention.

Referring to the accompany drawing in which like reference numerals refer to like parts in the several views, valve 10 with valve stem 12 has a sleeve 14 formed of flexible elastomeric material covering the outer surface of the stem and discharge openings on parts 20. Valve stem 12 has a hollow cylindrical central bore 18 extending from an inlet 16, through which material to be dispensed can be pumped to an end wall 19. The stem has a slender hollow cylindrical end, a collar 17 intermediate its ends and a threaded end 15 for attachment to a fitting connected to a source of material. As the pressure on the material being pumped into bore 18 is increased, the elastomeric sleeve 14 will gradually expand allowing the material to flow outward from the bore 18 through the discharge opening 20 and the aperture 22 at the end of sleeve 14 into a mixing chamber or appropriate receiving vessel. The sleeve 14 is held to the outside of the stem by elastic force and at its end opposite the aperture 22 by suitable securing means ensuring the material will flow out the aperture 22.

Figure 2:
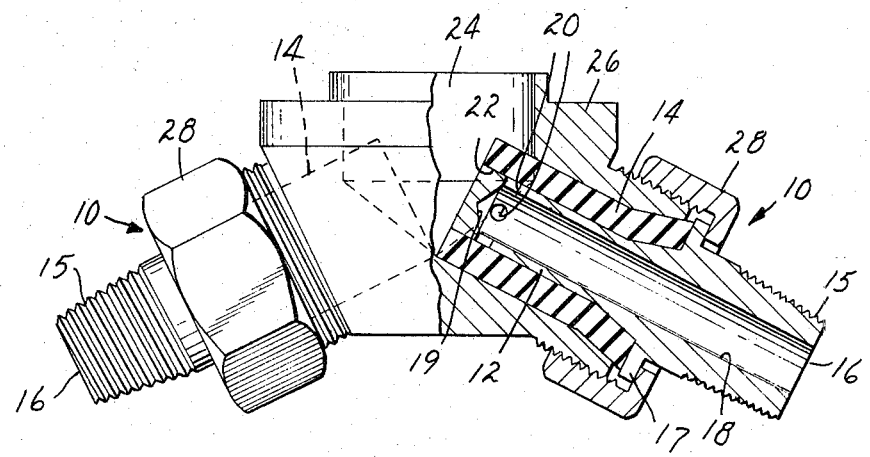
FIG. 2 is a side elevation in partial section of a mixing chamber using the valve of this invention.

Valves of this invention are particularly useful for use in mixing two-part resin systems where components are pumped separately into a mixing chamber. One example of such a mixing chamber, using valves of this invention, is shown in FIG. 2. In this application, two valves 10 are shown with apertures 22 disposed in a fitting 26 having a mixing chamber 24 defined by a bore with a conical end wall. The components to be mixed are pumped in at inlets 16 passing through bore 18 and are dispensed, via discharge openings 20, into chamber 24. The axes of the two valves are disposed at an angle of 125° and the impingement of the two materials as they come out of the apertures 22 causes a proper mixing in mixing chamber 24. The mixed materials can be withdrawn or pushed out by the influx of additional material.

As shown, the valve stem 12 of each valve 10 is retained in the fitting on housing 26 containing mixing chamber 24 by means of nut 28; the housing also serves to hold elastomeric sleeve 14 in place on valve stem 12.

The valve stem can be machined from round rod stock to provide a cylindrical stem of a strong material which will stand the operating pressures common to these valves, such pressures being in the order of 50-to-1000 pounds per square inch. Suitable materials include metals and alloys, e.g., brass, steel or aluminum; thermoplastics, e.g., ultra high molecular weight polyethylene, as well as thermoset plastics. The metallic materials provide strong inexpensive stems; while the plastics provide stems with low adhesion properties and can be injection molded.

The material used for the elastomeric sleeve is flexible enough to stretch when pressure is applied to fluid material at the inlet ports which allows the fluid material to flow outward and through the aperture at the end of the sleeve. But, the sleeve has sufficient elasticity to return to its original position about the stem when the pressure at the discharge openings is decreased thereby forcing the material from between the sleeve and stem and closing the valve. The sleeve will tightly seal the outlet ports not only when the pressure is released on the valve but also if foreign matter becomes entrapped between the sleeve and the valve stem. The elasticity of the sleeve allows it to conform to and partially surround the foreign matter; the remainder of the sleeve conforms to its original configuration, sealing the discharge openings.

In choosing the elastomeric material for making a sleeve suitable for use in this invention, the durometer of the elastomeric material will determine the pressure range in which the valve operates. Generally speaking, } the rubber sleeve will have a Shore A durometer of from about 30 to about 80. When low pressure systems are used the hardness of the elastomeric material would generally be about 30 to about 50 Shore A durometer; whereas, for systems where higher pressures are desired a Shore A of about 50—80 is preferred. The overall preferred range for elastomeric materials is from about 40 to about 70 to form a valve suitable for operating at moderate pressures normally used for mixing resin systems.

The durometer of the flexible material is also important in determining how quickly the valve will close. With relatively low viscosity materials the valve will close rapidly even at 30 or 40 durometer but higher viscosity materials, e.g. 400 centipoise and higher require a somewhat stiffer sleeve for rapid closure. The durometer necessary to achieve the desired speed of shut off is easily determined by simple emperical experimentation.

In addition to elasticity, the elastomeric material chosen for the flexible sleeve must not adhere or react with the polymeric resin components being mixed. If the material of the elastomer sleeve or valve stem reacts with the material being forced there through, perhaps the sleeve would adhere to the valve stem and the valve would not open upon the application pressure. In addition, by having a sleeve to which the resin is nonadherent, each successive use of the valve flushes out any partially reacted resinous material or foreign matter which may have become entrapped between the valve stem and the elastomeric sleeve. Suitable elastomeric materials, for use in forming the sleeve of this invention include elastomeric polymers, e.g., polychloroprene, sold under the trademark "Neoprene" silicone elastomers such as those sold under the designations SE-456 and SE-476 available from General Electric Company, Waterford, New York, and fluoroelastomers such as those sold under the trademarks "Fluorel" or "Viton". The preferred elastomers are the silicones because of their known release characteristics.

What is claimed is:

1. A mixing chamber suitable for mixing a plurality of materials comprising:
   a housing having a mixing chamber with inlets and an outlet; and
   check valves securely mounted in said inlets, said valves comprising a valve stem projecting into said chamber and having a central bore terminating with a closed end wall, a discharge opening in said stem adjacent said end wall, an inlet end opposite said end wall and a flexible sleeve of elastomeric material covering said stem, one end of said sleeve covering said discharge opening and the other end of said sleeve, opposite said discharge opening, being firmly secured to said stem, said valves having axes which are in an angular relationship to each other whereby when material is pumped in said inlet end through said bore and out said discharge opening, said sleeve expands allowing material to flow into said mixing chamber where the materials impinge causing mixing and when no material is being pumped through said bore, said sleeve contracts covering said discharge opening and preventing material from said mixing chamber from entering said discharge opening.

2. The check valve of claim 1, where said sleeve is polychloroprene.

3. The check valve of claim 1 where said sleeve is silicone rubber.

4. The check valve of claim 1, where said sleeve has a Shore A durometer of about 30 to about 80.

* * * * *